United States Patent [19]

King

[11] Patent Number: 4,465,604
[45] Date of Patent: Aug. 14, 1984

[54] LUBRICATING COMPOSITIONS AND PROCESS USING COMPLEX METAL CHALCOGENIDES

[75] Inventor: James P. King, Lansdale, Pa.

[73] Assignee: Pennwalt Corporation, Philadelphia, Pa.

[21] Appl. No.: 502,786

[22] Filed: Jun. 9, 1983

[51] Int. Cl.$^3$ .................. C10M 1/38; C10M 1/54; C10M 5/22; C10M 5/28

[52] U.S. Cl. .................. 252/37.2; 423/508; 423/518; 252/25

[58] Field of Search .............. 252/25, 37.2; 423/508, 423/511, 518

[56] References Cited

U.S. PATENT DOCUMENTS

| | | | |
|---|---|---|---|
| 2,421,543 | 6/1947 | Cook | 252/25 |
| 3,766,064 | 10/1973 | Gamble et al. | 252/25 |
| 3,769,210 | 10/1973 | Cais et al. | 252/25 |
| 3,888,776 | 6/1975 | Silverstein | 252/25 |
| 3,965,016 | 6/1976 | Soulen | 252/25 |
| 4,094,893 | 6/1978 | Dines | 252/25 |

OTHER PUBLICATIONS

King, J. P. et al., "Solid Lubricants for Improved Wear Resistance", Final Report, ONR Contract N00014-7-9-C-0305, Jul. 1982.
King et al., "Investigation of Extreme-Pressure and Antiwear Properties of Antimony Thioantimonate", ASLE Transactions, 24 4, pp. 497–507, (1980).
Chemical Abstracts, 65, 8623g, "Noncorrosive Lubricants for Working Surfaces", FR 1,423,641/1966.
King, J. P. et al., "Effect of Antimony Thioantimonate in Greases on Abrasive Wear", Symposium on Innovation for Maintenance Technology Improvements, 1981.

Primary Examiner—Jacqueline V. Howard

[57] ABSTRACT

High-temperature lubricant compositions which have good extreme pressure and antiwear properties include complex metal chalcogenides having the formula:

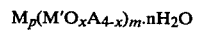

$$M_p(M'O_xA_{4-x})_m \cdot nH_2O$$

where M is a metal selected from the group consisting of: Na, K, Cs, Mg, V, Mn, Fe, Co, Al, Cu, Ga, In, Bi, As, Ni, Zn, Cd, Sb, Sn and Ce;
where M' is a metal selected from the group consisting of Mo and W;
where A is S or Se;
where x ranges from 1 to 3;
where p is 1 or 2 depending on the oxidation state of M;
where m is ranges from 1 to 5 depending on the oxidation state of M;
and n ranges from 0 to 6.

23 Claims, No Drawings

LUBRICATING COMPOSITIONS AND PROCESS USING COMPLEX METAL CHALCOGENIDES

The Government has rights in this invention pursuant to Contract Number N00014-79-C-0305, awarded by the Department of the Navy.

BACKGROUND OF THE INVENTION

This invention relates generally to high temperature lubrication and more specifically to lubricant compositions and their use. The compositions contain complex metal chalcogenides which are compatible with various steels and alloys and which provide antiwear and extreme pressure properties.

Commonly used solid lubricants or solid lubricant additives are graphite, molybdenum disulfide, polytetrafluoroethane, lead oxide, boron nitride, alkaline metal borates, arsenic thioantimonate, and so forth. These solid lubricants have certain disadvantages, such as limited high temperature stability, hydrolytic instability, potential toxicity, inferior performance under high vacuum or high temperature, or undesirable by-products after exposure to high temperature. Antimony thioantimonate ($SbSbS_4$) has excellent extreme pressure and antiwear properties when used as a lubricant additive as described, for example, in U.S. Pat. No. 3,965,016. In modern high temperature lubricating applications using various steels and alloys, lubricants having even better antiwear properties are desirable.

BRIEF SUMMARY OF THE INVENTION

In accordance with this invention, there are provided lubricating compositions comprising a lubricant and at least one complex metal chalcogenide selected from the group having the formula $$M_p(M'O_xA_{4-x})_m \cdot nH_2O$$

Where M is a metal selected from the group consisting of: Na, K, Cs, Mg, V, Mn, Fe, Co, Al, Cu, Ga, In, Bi, As, Ni, Zn, Cd, Sb, Sn and Ce;
where M' is a metal selected from the group consisting of Mo and W;
where A is S or Se;
where x ranges from 1 to 3;
where p is 1 or 2 depending on the oxidation state of M;
where m ranges from 1 to 5 depending on the oxidation state of M;
and n ranges from 0 to 6.

Also provided is a method of lubrication comprising contacting the surface to be lubricated with a lubricating composition comprising at least one complex metal chalcogenide selected from the group having the formula defined above. The chalcogenides can be used either as solid, primary lubricants or as additives to lubricating compositions such as greases, mineral oils, synthetic fluids and aqueous media to improve the extreme pressure and antiwear properties of the lubricating compositions.

DETAILED DESCRIPTION

The complex metal chalcogenides which are useful in the lubricating compositions and process of the invention have the general formula:

$$M_p(M'O_xA_{4-x})_m \cdot nH_2O$$

Where M is a metal selected from the group consisting of: Na, K, Cs, Mg, V, Mn, Fe, Co, Al, Cu, Ga, In, Bi, As, Ni, Zn, Cd, Sb, Sn and Ce;
where M' is a metal selected from the group consisting of Mo and W;
where A is S or Se;
where x ranges from 1 to 3;
where p is 1 or 2 depending on the oxidation state of M;
where m ranges from 1 to 5 depending on the oxidation state of M;
and n ranges from 0 to 6.

The complex metal chalcogenides can be used as lubricant compositions per se by applying them to the surface requiring lubrication either alone or in combination with other solid lubricants. Such use is especially applicable where very high operating temperatures are involved so that base greases or oils would decompose at the operating temperatures. The chalcogenides are also advantageously used as lubricant additives to greases, mineral oils, synthetic fluids, or aqueous media to provide lubricant compositions having superior extreme pressure and antiwear properties.

The complex metal chalcogenides generally are incorporated in lubricant compositions in a particulate form, i.e., as a finely-divided powder having a particle size, in general, within the range of about 0.01 micron to about 100 microns, and preferably within the range of about 0.01 to 10 microns. The compositions embodied herein are useful for lubricating the contacting surfaces of a wide variety of materials, for example, metals such as steel, molybdenum, copper, zinc, bronze, brass, Monel and other metals and metal alloys, plastics, ceramics, graphite, and other materials, wherein the contacting surfaces may be of the same or different materials. The grease can be a natural petroleum grease, which may contain small amounts of antioxidants, anti-corrosives, or other additives; or a synthetic grease comprised of a synthetic ester such as dioctyl sebacate, dioctyl adipate, tributyl phosphate, di-2-ethyl hexyl sebacate, and the like, containing from about 5% to 45% of a thickener such as lithium stearate, aluminum stearate, lithium hydroxy-stearate, calcium stearate, silica, clay, and the like; and small amounts of other additives, such as antioxidants and anti-corrosion agents. Other greases which are improved by the complex metal chalcogenides include silicone greases comprised of a a silicone oil contianing a thickening agent such as tetrafluoroethylene polymers and copolymers and other fluoropolymers. The complex metal chalcogenides also find utility as a component of a lubricating dispersion comprising a liquid oil carrier such as a hydrocarbon oil, synthetic ester oil, or silicone oil.

The effective amounts of complex metal chalcogenide used in the lubricant compositions and process will vary depending upon the particular application. Generally, amounts of from about 0.1 to 60% by weight based on the total weight of the lubricant composition, preferably about 0.5 to 20% by weight, are useful where the chalcogenide is used as a lubricant additive and up to 100% where the complex metal chalcogenide is used as a primary lubricant. Other lubricant additives can also be employed in the compositions of the invention such as molybdenum disulfide or antimony thioantimonate.

The invention is further illustrated by, but is not intended to be limited to, the following examples in which complex metal chalcogenides of zinc, cerium and antimony were prepared and tested as lubricant additives in greases.

Procedure A

Preparation of ammonium Oxythiomolybdate-$(NH_4)_2MoO_2S_2$

Ammonium oxythiomolybdate, $(NH_4)_2MoO_2S_2$, was prepared according to a published procedure (G. Kruss, Ann. Chem., 225 (1884), F. W. Moore and M. L. Larson, Inorg. Chem., 6 (5) 998–1003 [1967]) by treating an ammonium paramolybdate solution [10.0 grams of $(NH_4)_2Mo_7O_{24}.4H_2O$ dissolved in 600 ml of 3.3 normal ammonium hydroxide solution] with $H_2S$ at 4–7° C. The resulting yellow solid was isolated by filtration under a nitrogen atmosphere and washed once with ice water and twice with 95% ethanol. After drying under a nitrogen stream, 17 grams of ammonium oxythiomolybdate, $(NH_4)_2MoO_2S_2$, was obtained.

Procedure B

Preparation of $Cs_2MoOS_3$

Cesium oxythiomolybdate, $Cs_2MoOS_3$, was prepared according to a published procedure (V. A. Muller, et al. Z. Anorg. Und. Allgem Chem., 371, 136–148 [1969]). A mixture of 5.0 grams of sodium molybdate, $Na_2MoO_4.2H_2O$, 9.1 grams of cesium acetate (15% excess) and 15 ml of 30% by weight ammonium hydroxide solution produced a solution having a pH of 12.8. The solution was acidified with 4.6 grams glacial acetic acid to lower the pH to 10 and then $H_2S$ was bubbled through the solution. An orange, crystalline solid formed which was isolated by filtration, washed with ethanol, and dried at 110° C. for five hours. The product weighed 9.0 grams (yield 92%).

Calculated for $Cs_2MoOS_3$: Cs, 56.4; Mo, 20.3; S, 20.3. Found: Cs, 54.2; Mo, 21.1; S, 21.9.

Procedure C

Preparation of $ZnMoO_2S_2.3H_2O$

An aqueous solution of $ZnCl_2$ (5.4 grams in 50 ml of distilled water) was slowly added to a solution of $(NH_4)_2MoO_2S_2$ (9.0 grams in 100 ml of distilled water), which compound was prepared accordingly to procedure A. The reaction mixture was agitated for one hour at room temperature after complete addition of the $ZnCl_2$ solution. A black solid was collected on a filter, washed twice with distilled water and dried at 110° C. for three hours (6.6 grams 66% yield). X-ray diffraction study indicated that this material was amorphous.

Calculated for $ZnMoO_2S_2.3H_2O$: Mo, 30.8; S, 20.6; Zn, 21.0. Found: Mo, 29.8; S, 23.4; Zn, 23.9.

Procedure D

Preparation of $ZnMoOS_3.3H_2O$

An aqueous solution of 4.4 grams of $ZnCl_2$ in 30 ml of distilled water was slowly added to a solution of 15.4 grams of $Cs_2(MoOS_3)$, which was prepared according to procedure B, in 100 ml of distilled water at room temperature resulting in precipitation of a brown solid. The reaction mixture was refluxed for 1.5 hours and filtered. The solid product was washed several times with distilled water and dried at 105° C. for three hours. The gray, solid product (10.2 grams) was amorphous as determined by X-ray diffraction.

Calculated for $ZnMoOS_3.3H_2O$: Mo, 29.3; S, 29.3; Zn, 19.9. Found: Mo, 30.9; S, 29.9; Zn, 23.4.

Procedure E

Preparation of $Ce_2(MoO_xS_{4-x})_3.nH_2O$

A solution of 19.8 grams of $CeCl_3.7H_2O$ in 82 ml of distilled water and a solution of 20.7 grams of $(NH_4)MoS_4$ in 152 ml of distilled water were added simultaneously to a flask under a nitrogen atmosphere. The resulting reaction mixture was refluxed for 4.5 hours with agitation and was then allowed to cool to room temperature. A brown solid was isolated by filtration and washed with distilled water, acetone and $CCl_4$, respectively. The solid product was dried at 95° C. for 12 hours following which it was found to weight 25 grams. The product was found to be amorphous by X-ray diffraction. A sample of the hydrated product was heated at 110° C. for 20 hours and then at 144° C. for 30 minutes, resulting in 2.4% and zero percent weight reduction, respectively. This would indicate that complete dehydration below 144° C. is difficult.

Calculated for $Ce_2(MoO_{1.2}S_{2.8})_3.6H_2O$: Ce, 28.2; Mo, 28.0; S, 27.1 (10.9% $H_2O$). Found: Ce, 30.3; Mo, 28.3; S, 26.3.

Procedure F.

Preparation of $Ce_2(MoOS_3)_3$

A solution of 9.3 grams of $CeCl_3.7H_2O$ in 36 ml of distilled water was added dropwise to a hot solution of $Cs_2MoOS_3$, which was prepared according to procedure B, (17.7 grams in 150 ml of distilled water). The reaction mixture was refluxed for 1.5 hours after complete addition of the cerium chloride solution. The dark brown solid which deposited was isolated by filtration and washed with distilled water and acetone, respectively. The solid product was dried at 100° C. for six hours (dry weight = 10.1 grams).

Calculated for $Ce_2(MoOS_3)_3$: Ce, 31.0; Mo, 31.8. Found: Ce, 31.7; Mo, 28.0.

Procedure G

Preparation of $Sb_2(MoOS_3)_3$

A solution of $(NH_4)_2MoS_4$ (10.3 grams dissolved in 100 ml distilled water) was combined with a solution containing 3.85 grams $Sb_2O_3$ and 46.5 grams 45% by weight KOH. The resulting solution was chilled below 5° C. and was added dropwise with hydrochloric acid solution (82 grams 37% by weight HCl diluted with 70 ml distilled water) under a nitrogen atmosphere at a temperature between 5° and 13° C. with agitation. A dark solid was deposited at the end of the addition of hydrochloric acid (pH 1–2). The solid was isolated by filtration and washed with distilled water, 95% EtOH and $CCl_4$, respectively. After drying under vacuum, a dark gray solid (13.2 grams) was obtained.

Calculated for $Sb_2(MoOS_3)_3$: S, 33.2; Mo, 33.1; Sb, 28.0. Found: S, 35.3; Mo, 29.3; Sb, 27.9.

EXAMPLES 1 & 2

Lubricant compositions were prepared by mixing 5% by weight of the zinc complexes prepared by procedures C and D with lithium grease. Compositions containing the zinc complexes which were partially dehydrated were also prepared. The compositions were tested in comparison to both a lithium grease control and a lithium grease which contained 5% by weight of molybdenum disulfide as set out in Table I.

TABLE I
LUBRICANT PROPERTIES OF OXYTHIOMOLYBDATE COMPLEXES

| Grease Composition | Weld Pt.[c] kg | LWI[c] | Wear Scar Diameter, mm[a] | | | |
|---|---|---|---|---|---|---|
| | | | Before Dehydration | | After Dehydration[b] | |
| | | | 52100 | SS 440 | 52100 | SS 440 |
| Control: Lithium Grease (L.G.) | 140 | 18.3 | 0.70 | 3.96 | — | — |
| Comparison: L.G. + 5% $MoS_2$ | 250 | 30.4 | 0.65 | 2.34 | — | — |
| Example 1: L.G. + 5% $ZnMoOS_3 \cdot 3H_2O$ | 315 | 52.0 | 0.44 | 0.53 | 0.50 | 1.50 |
| Example 2: L.G. + 5% $ZnMoO_2S_2 \cdot 3H_2O$ | 315 | 60.6 | 0.40 | 0.84 | 0.48 | 0.61 |

[a]ASTM D-2266 1200 rpm, 167° F., and 40 kg for 1 hour
[b]The zinc complexes were dehydrated under $N_2$ at 350° C. for two hours.
[c]52100 tool steel ASTM D-2596

EXAMPLES 3-5

Lubricant compositions were prepared by mixing 5% by weight of the cerium complex prepared by procedure E with both lithium and Al complex greases and by mixing 5% by weight of the antimony complex prepared by procedure F with lithium. These compositions were tested in comparison to both grease controls without additives and those containing 5% by weight of molybdenum disulfide as set out in Table II.

TABLE II
LUBRICATING PROPERTIES OF OXYTHIOLYBDATE COMPLEXES IN TWO DIFFERENT BASE GREASES

| Grease Composition | AISI-52100 Balls | | | AISI-440 SS Balls | | |
|---|---|---|---|---|---|---|
| | Weld Pt.[1] kg | LWI[1] | Scar Diam.[2] mm | Weld Pt.[1] kg | LWI[1] | Scar Diam.[2] mm |
| Cont. Lithium Grease (L.G.) | 140 | 18.0 | 0.70 | 80 | 3.5 | 3.96 |
| Comp. L.G. + 5% $MoS_2$ | 250 | 30.4 | 0.65 | 100 | 6.1 | 2.34 |
| Ex. 3: L.G. + 5% Ce Complex[3] | 250 | 41.4 | 0.40 | 100 | 10.4 | 1.38 |
| Ex. 4: L.G. + 5% $Sb_2(MoOS_3)_3$ | 400 | — | — | — | — | — |
| Control Al Complex Grease (A.G.) | 100 | 11.8 | — | — | — | — |
| Comp. A.G. + 5% $MoS_2$ | 190 | 35.5 | — | — | — | — |
| Ex. 5: A.G. + Ce Complex[3] | 200 | 40.2 | — | — | — | — |

[1]ASTM D-2596
[2]ASTM D-2266 - 1200 rpm, 167° F., 40 kg for 1 hour
[3]$Ce_2(MoO_{1.2}S_{2.8})_3 \cdot 6H_2O$ Tables I and II list the weld points, load wear indices, and wear scar diameters of the cesium and zinc oxythiomolybdate containing lubricants. As shown in Tables I and II, the superior lubricating properties, including extreme pressure and antiwear characteristics of these complex metal chalcogenides in greases, when compared to molybdenum disulfide, was demonstrated in the Shell Four Ball EP and wear testers using two different steels, 52100 tool steel and stainless steel 440. The results also show that the outstanding antiwear characteristics of the hydrated zinc samples were not adversely affected by partial dehydration at 350° C.

EXAMPLE 6

In order to illustrate the effect of using different amounts of additive on the lubricating properties, lithium grease lubricant compositions were prepared and tested which contained, by weight, 0.1, 0.5, 1 and 3% of the cerium complex used in Example 3. The test results obtained using the compositions are shown in Table III.

TABLE III

| Grease Composition | Wear Scar Diam.[1] mm. | |
|---|---|---|
| | 52100 steel | SS. 440 |
| Lithium Grease L.G. | 0.70 | 3.96 |
| L.G. + 0.1% cerium complex | 0.59 | 2.64 |
| L.G. + 0.5% cerium complex | 0.39 | 2.47 |
| L.G. + 1.0% cerium complex | 0.40 | 2.26 |
| L.G. + 3.0% cerium complex | 0.41 | 1.84 |

[1]ASTM-D-2266-1200 rpm, 167° F., 40 kg for one hour.

Heretofore, there have been severe limitations placed on the use of corrosion-resistant alloys, such as stainless steels, because of their inferior antiwear properties. This is because very few lubricant additives exhibit good compatibility with these alloys. One of the outstanding features of the composition and process of this invention is the superior antiwear properties for various steels and alloys, particularly corrosion-resistant alloys like stainless steel 440.

I claim:

1. A lubricating composition comprising a lubricant and at least one complex metal chalcogenide selected from the group having the formula:

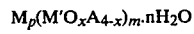

$$M_p(M'O_xA_{4-x})_m \cdot nH_2O$$

where M is a metal selected from the group consisting of: Na, K, Cs, Mg, V, Mn, Fe, Co, Al, Cu, Ga, In, Bi, As, Ni, Zn, Cd, Sb, Sn and Ce;

where M' is a metal selected from the group consisting of Mo and W;

where A is S or Se;

where x ranges from 1 to 3;

where p is 1 or 2;

where m ranges from 1 to 5;

and n ranges from 0 to 6.

2. The lubricant composition of claim 1 wherein the complex metal chalcogenide is present in an amount of from about 0.1 to 60% by weight of composition.

3. The lubricant composition of claim 1 wherein the complex metal chalcogenide is present in an amount of from about 0.5 to 20% by weight of composition.

4. The composition of claim 1 wherein M is selected from the group consisting of Zn, Sb, and Ce; M' is Mo and A is sulfur.

5. The composition of claim 4 wherein M is Zn and X is 1 or 2.

6. The composition of claim 4 wherein M is Sb.

7. The composition of claim 4 wherein M is Ce.

8. The composition of claim 1 wherein the lubricant is a grease.

9. The composition of claim 8 wherein the grease is a silicone grease.

10. The composition of claim 8 wherein the grease is a lithium grease.

11. The composition of claim 8 wherein the grease is an aluminum complex grease.

12. A method of lubricating comprising contacting the surface to be lubricated with a lubricating composition comprising at least one complex metal chalcogenide selected from the group having the formula:

$$M_p(M'O_xA_{4-x})_m \cdot nH_2O$$

where M is a metal selected from the group consisting of: Na, K, Cs, Mg, V, Mn, Fe, Co, Al, Cu, Ga, In, Bi, As, Ni, Zn, Cd, Sb, Sn and Ce;
where M' is a metal selected from the group consisting of Mo and W;
where A is S or Se;
where x ranges from 1 to 3;
where p is 1 or 2;
where m ranges from 1 to 5;
and n ranges from 0 to 6.

13. The method of claim 12 wherein the lubricating composition comprises a lubricant and from about 0.1 to 60% by weight of lubricating composition of said complex metal chalcogenide.

14. The method of claim 12 wherein the lubricant is a grease.

15. The method of claim 14 wherein the lubricant is a silicone grease.

16. The method of claim 14 wherein the lubricant is a lithium grease.

17. The method of claim 14 wherein the lubricant is an Al complex grease.

18. The method of claim 12 wherein the complex metal chalcogenide is present in an amount of from about 0.1 to 100% by weight of composition.

19. The method of claim 12 wherein the complex metal chalcogenide is present in an amount of from about 0.5 to 20% by weight of composition.

20. The method of claim 12 wherein M is selected from the group consisting of Zn, Sb, and Ce; M' is Mo and A is sulfur.

21. The method of claim 20 wherein M is Zn and X is 1 or 2.

22. The method of claim 20 wherein M is Sb.

23. The method of claim 20 wherein M is Ce.

* * * * *